Patented Sept. 3, 1946

2,407,207

UNITED STATES PATENT OFFICE 2,407,207

PROCESS OF PRODUCING P-PHENYLENE DIAMINES

Ilmari F. Salminen and Arnold Weissberger, Rochester, N. Y., assignors to Eastman Kodak Company, Rochester, N. Y., a corporation of New Jersey No Drawing. Application June 8, 1944, Serial No. 539,398

6 Claims. (Cl. 260—558)

This invention relates to p-phenylene diamines and particularly to N-benzoyl-N'-acylaceto-p-phenylene diamines and to their preparation.

This application is a continuation-in-part of our application Serial No. 464,892 filed November 7, 1942, now Patent 2,359,332, granted October 3, 1944.

It is an object of this invention to provide a method for obtaining valuable p-phenylene diamine derivatives. A further object is to provide compounds useful as couplers in color-forming processes of color photography.

These objects are accomplished by the provision of compounds having the following probable structure:

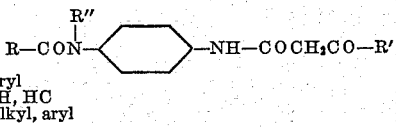

R=aryl
R''=H, HC
R'=alkyl, aryl in which R is an aryl radical, such as phenyl or tolyl; R' is an alkyl radical, such as methyl, ethyl, or propyl, or an aryl radical, such as phenyl, or anisyl; and R'' is hydrogen or a hydrocarbon radical, such as methyl, ethyl, propyl, phenyl, benzyl, or gamma phenyl propyl.

These compounds are prepared in general by condensing a benzoyl chloride using p-nitroaniline and reducing the nitro group of the nitroaniline to an amine. The resulting benzamidoaniline is then condensed with an ethyl acyl acetate to produce the N-benzoyl-N'-acylaceto-p-phenylene diamine.

The following compounds are illustrative of our invention:

1.
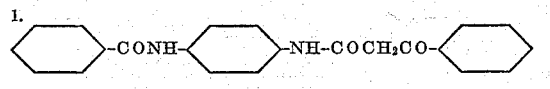

N-benzoyl-N'-benzoyl-aceto-p-phenylenediamine

2.
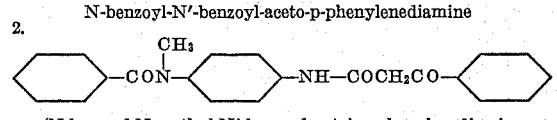

(N-benzoyl-N-methyl-N'-benzoylaceto)-p-phenylenediamine

3.
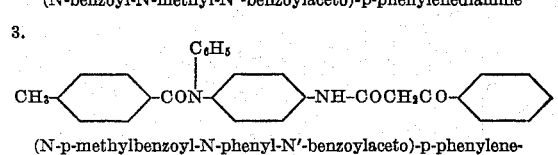

(N-p-methylbenzoyl-N-phenyl-N'-benzoylaceto)-p-phenylenediamine

4.
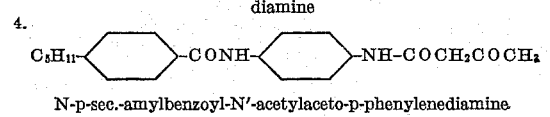

N-p-sec.-amylbenzoyl-N'-acetylaceto-p-phenylenediamine

5.
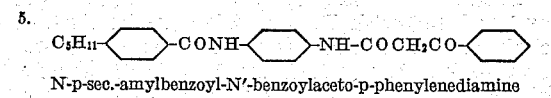

N-p-sec.-amylbenzoyl-N'-benzoylaceto-p-phenylenediamine

6.
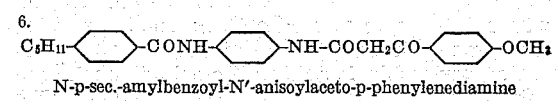

N-p-sec.-amylbenzoyl-N'-anisoylaceto-p-phenylenediamine

7.
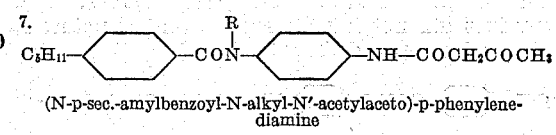

(N-p-sec.-amylbenzoyl-N-alkyl-N'-acetylaceto)-p-phenylenediamine

8.
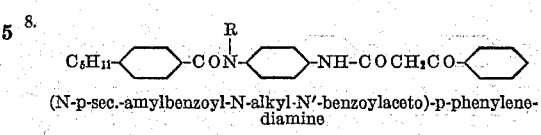

(N-p-sec.-amylbenzoyl-N-alkyl-N'-benzoylaceto)-p-phenylenediamine

Our compounds may be prepared by condensation of the suitable benzoyl chloride with the suitable amine alone or in the presence of alkyline agents, such as sodium acetate, pyridine etc. The benzoyl chlorides are readily available or may be prepared in any suitable manner. For example, p-secondary amylbenzoyl chloride may be prepared from secondary amylbenzene and acetic anhydride or acetyl chloride by condensation in a Friedel-Crafts reaction to an acetophenone. The acetophenone is then oxidized with sodium hypochlorite to p-secondary amylbenzoic acid, and this is converted by means of phosphorous trichloride or thionyl chloride to the acid chloride.

As a specific illustration of the method of preparing our compounds, N-p-secondary-amylbenzoyl-N'-benzoyl aceto-p-phenylenediamine may be produced as follows:

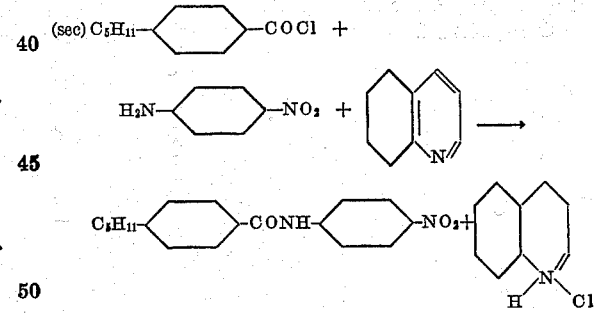

To a stirred solution of 6.9 grams (0.05 mole) of p-nitroaniline in 30 cc. of dry quinoline was added 10.5 grams of p-sec.-amylbenzoyl chloride. The temperature of the mixture rose spontaneously to 60°, and the solution was then heated on a steam bath for two hours. After standing overnight at room temperature, the solution was poured into 500 cc. of 5% cold hydrochloric acid. The organic layer was extracted with 100 cc. of ether. The ether layer was washed successively with dilute hydrochloric acid, water, dilute sodium carbonate and with water again. The ether extract was dried, and concentrated to a viscous, yellow oil.

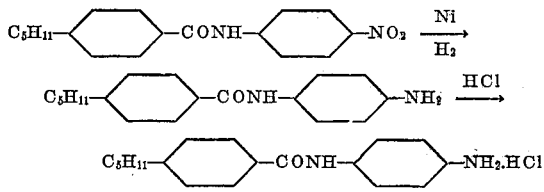

The oil was dissolved in 100 cc. of ethyl alcohol and reduced with Raney nickel in the Adam's shaker at an initial pressure of 40 lbs./sq. in. and at 90–100°. It required about six hours for the absorption of the correct amount of hydrogen. The catalyst was filtered off, and the hydrochloride was isolated by carefully adding concentrated hydrochloric acid to the cold alcoholic solution. The yield was 8.0 grams (53%). The product did not have a sharp melting point; it slowly decomposed above 200°.

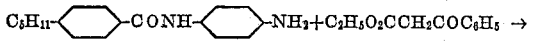

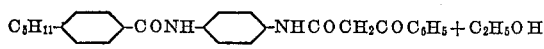

Eight and one tenth grams (0.03 mole) of 4-(4'-sec.-amylbenzamido)aniline hydrochloride was suspended in 200 cc. of 2% alkali and extracted with 100 cc. of benzene. The benzene extract was washed with dilute sodium carbonate, then thoroughly with water and the solution dried with calcium chloride. Then 25 cc. of xylene was added and the benzene was distilled off.

In the meantime, 6 cc. of ethyl benzoylacetate in 25 cc. of xylene was heated to 150° in a 50 cc. flask connected through an 8-inch steam-jacketed column to a downward water-cooled condenser. The xylene solution of the amine was added to this solution, and the mixture was heated at 150° until no more distillate was obtained. This required about one hour and 3.0 cc. of distillate was collected. Half of the distillate was alcohol which was 85% of theory. The reaction mixture on cooling deposited 5.1 grams of product which melted at 234–235°. It was recrystallized from 125 cc. of glacial acetic acid, obtaining 3.3 grams, M. P. 238–239°.

Compound 1 is similarly prepared using benzoyl chloride in place of p-secondary amyl benzoyl chloride.

Compound 2 is similarly prepared using benzoyl chloride in place of p-secondary amyl benzoyl chloride, and p-nitromethylaniline in place of p-nitroaniline.

Compound 3 is similarly prepared using p-toluyl chloride in place of benzoyl chloride, and 4-nitrodiphenyl amine in place of p-nitroaniline.

Compound 4 is similarly prepared using ethyl acetyl acetate in place of ethyl benzoyl acetate.

Our compounds contain an active methylene group attached to carbonyl groups, by reason of which they are active in dye-forming reactions. They are especially useful in dye-forming reactions in which they combine with oxidized p-phenylene diamines to produce azomethine dyes.

It will be understood that the foregoing examples and specific embodiments of the invention are illustrative only and that the invention is not limited thereby except as indicated in the appended claims.

We claim:

1. A compound having the following formula:

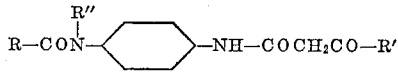

where R is an aryl radical, R'' is selected from the class consisting of hydrogen and hydrocarbon groups, and R' is selected from the class consisting of alkyl and aryl groups.

2. A compound having the following formula:

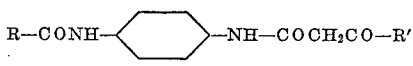

where R is an aryl radical and R' is selected from the class consisting of alkyl and aryl groups.

3. A compound having the following formula:

where R' is selected from the class consisting of alkyl and aryl groups.

4. A compound having the following formula:

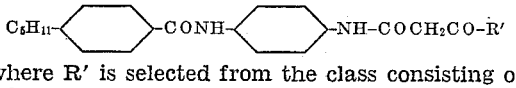

where R' is selected from the class consisting of alkyl and aryl groups.

5. A compound having the following formula:

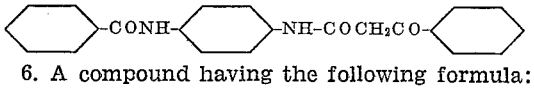

6. A compound having the following formula:

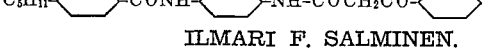

ILMARI F. SALMINEN.
ARNOLD WEISSBERGER.